US005458446A

United States Patent [19]

Englert et al.

[11] Patent Number: 5,458,446

[45] Date of Patent: Oct. 17, 1995

[54] PRESSING MECHANISM FOR MACHINES FOR SHAPING WORKPIECES

[75] Inventors: Heiner Englert, Lauda-Königshofen; Winfried Reuter, Tauberbischofsheim, both of Germany

[73] Assignee: Michael Weinig Aktiengesellschaft, Tauberbischofsheim, Germany

[21] Appl. No.: 310,975

[22] Filed: Sep. 23, 1994

[30] Foreign Application Priority Data

Sep. 23, 1993 [DE] Germany .......................... 43 32 281.6

[51] Int. Cl.[6] ................................ B23C 1/02; B27C 1/10

[52] U.S. Cl. ................ 409/178; 144/117 R; 144/117 C; 144/253 G; 409/220

[58] Field of Search .................................... 409/175, 134, 409/180, 181, 220, 228, 139, 178, 141; 144/134 D, 117 R, 114 R, 253 G, 117 A, 172; 299/39

[56] References Cited

U.S. PATENT DOCUMENTS

| | | | |
|---|---|---|---|
| 1,802,096 | 4/1931 | Tautz | 114/117 R |
| 4,382,729 | 5/1983 | Bachmann | 409/178 |
| 4,997,017 | 3/1991 | Dobbie | 144/117 R X |
| 5,017,061 | 5/1991 | Mombers | 409/141 |

FOREIGN PATENT DOCUMENTS

| | | | |
|---|---|---|---|
| 644675 | 7/1962 | Canada | 144/253 G |
| 126285 | 11/1984 | European Pat. Off. | 114/117 R |
| 3341219 | 5/1985 | Germany | 144/114 R |

*Primary Examiner*—William Briggs
*Attorney, Agent, or Firm*—Robert W. Becker & Associates

[57] ABSTRACT

A pressing mechanism for machines for shaping workpieces. The mechanism has a rotatebly driven spindle on which are secured shaping tools having a path diameter determine by cutters. The mechanism also has presser elements that, as viewed in the direction of feed of workpieces that are to be shaped, are disposed ahead of and behind the spindle. To adapt to varying path diameters and forming depths of the cutters, the presser elements can be displaced transverse to the axis of the spindle. To adapt to varying path diameters of the tools, the presser elements can be moved in opposite directions at an angle to the direction of feed. To adapt to the respective forming depths of the cutters, the presser elements can be moved in different opposite directions at an angle to the direction of feed.

17 Claims, 1 Drawing Sheet

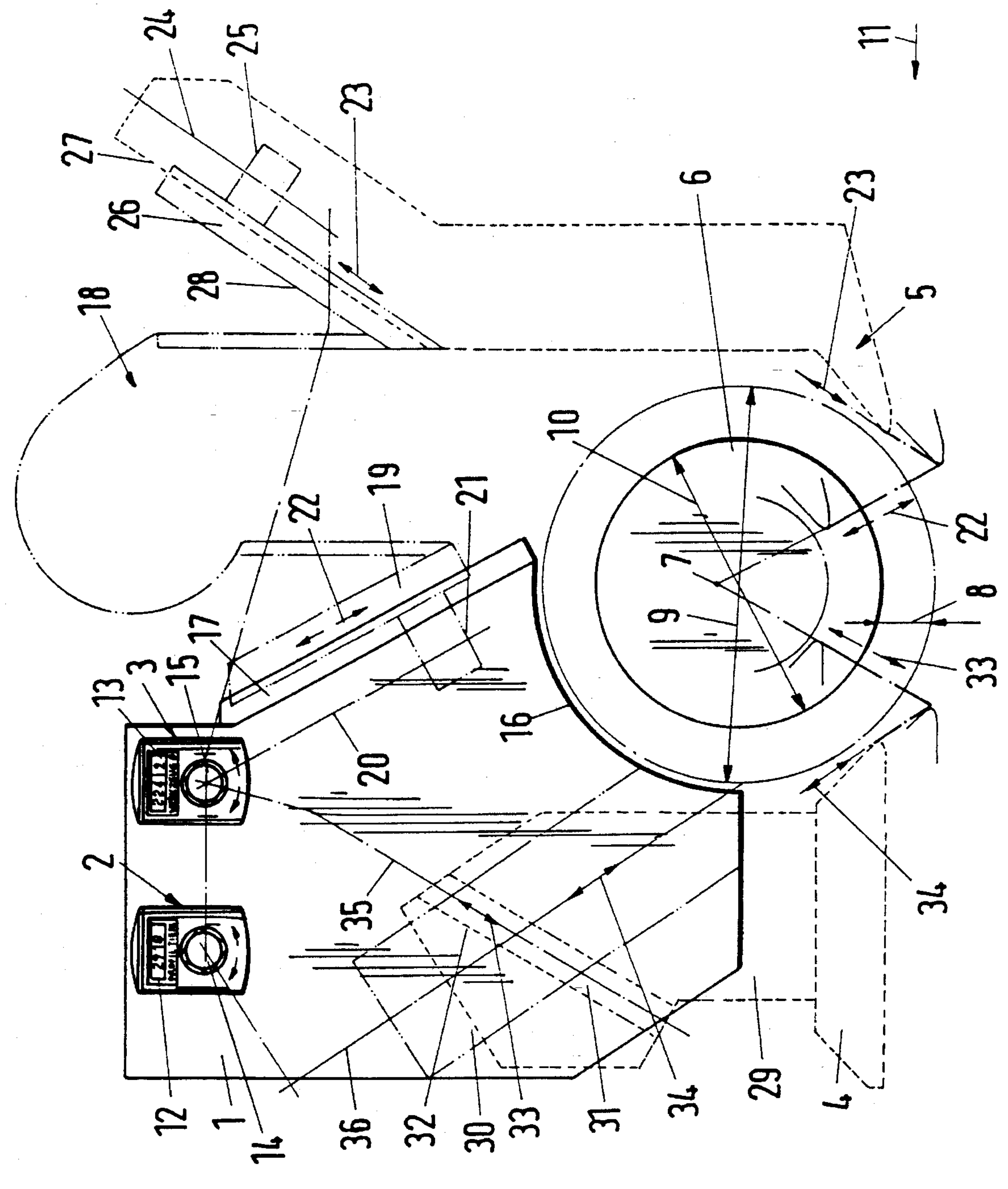

PRESSING MECHANISM FOR MACHINES FOR SHAPING WORKPIECES

BACKGROUND OF THE INVENTION

The present invention relates to a pressing mechanism for machines for shaping workpieces of wood, plastic and the like. The mechanism has at least one rotatably driven spindle on which can be secured shaping tools having a path diameter that is determined by cutters, preferably shaping or forming cutters. The mechanism also has presser elements that are disposed ahead of and behind the spindle as viewed in the direction of transport or feed of the workpieces that are to be shaped. To adapt to different path diameters and different forming depths of the shaping or forming cutters, the presser elements can be displaced transverse to the axis of the spindle.

Such a pressing mechanism is known and, when viewed in the direction of feed of the workpieces that are to be shaped, has a respective presser element ahead of and behind the spindle, i.e. the tool that is seated thereon. These presser elements rest upon the workpiece and prevent unacceptable movement of the workpiece during the shaping with the tool. In order to optimally support the workpiece during the shaping process, the presser elements must be disposed in the immediate vicinity of the tool. The adjustment of the presser elements of the known pressing mechanism is complicated and difficult. When a tool having a different path diameter is exchanged, the presser elements must be readjusted in conformity therewith. To accomplish this the presser elements are individually adjusted by eye-balling the position thereof, whereby not only the path diameter of the cutters of the tool, but also the forming depth of the cutters must be taken into consideration.

It is therefore an object of the present invention to improve the pressing mechanism of the aforementioned general type in such a way that the presser element can be easily and rapidly adjusted into the respective position.

BRIEF DESCRIPTION OF THE DRAWING

This object, and other objects and advantages of the present invention, will appear more clearly from the following specification in conjunction with the accompanying schematic drawing, which illustrates one exemplary embodiment of the inventive pressing mechanism.

SUMMARY OF THE INVENTION

The pressing mechanism of the present invention is characterized primarily in that the presser element can be moved in opposite directions, both at an angle to the direction of feed of the workpieces, to adapt to varying path diameters of the tool, and in that the presser elements can be moved in different opposite direction, also both at an angle to the direction of feed, to adapt to the respective forming depth of the shaping or forming cutters.

With the inventive pressing mechanism, the presser elements are displaced in the various inclined directions in order to be able to adjust the presser elements not only relative to the path diameters the of tool but also relative to the forming depths of the shaping or forming cutters of the tool. The positions of the directions of movement are selected in such a way that the presser elements obtain an optimum position during the adjustment as a function of the path diameter and of the forming depth of the respective tool. As a consequence, adjustment of the presser elements can also be easily, rapidly and precisely carried out even by less experienced personnel. The adjustment movements of the presser elements can preferably be effected linearly. However, it is also possible to bring the presser elements into the required position by an appropriate swinging movement in the respective direction, in other words, along a curved path.

Further specific features of the present invention will be described in detail subsequently.

DESCRIPTION OF PREFERRED EMBODIMENTS

Referring now to the drawing in detail, the pressing mechanism is employed with shaping machines for wood, plastic and the like, and serves for adjusting the position of presser elements, which are disposed ahead of and behind a rotating tool, as a function of the diameter of the tool and of the forming depth of the shaping or forming cutters of the tool.

The pressing mechanism has a stationary support means 1 on which are disposed two position adjustment instruments 2 and 3. The instrument 2 adjusts the position of the presser elements 4 and 5 relative to the forming depth, and the instrument 3 adjusts the position of the presser elements relative to the diameter of the tool. The tool 6 is fixedly seated on a spindle 7 of the shaping machine; in the illustrated embodiment, the spindle 7 extends horizontally. The tool 6 is a cutter head, on the periphery of which shaping or forming cutters are distributed in a known manner. In the drawing, the forming depth of the non-illustrated shaping or forming cutters is designated by the reference numeral 8. The tool 6 has a path diameter 9 that corresponds to the diameter of the tool. The base circle diameter 10 of the tool 6 is determined by the greatest forming depth 8 of the shaping or forming cutters of the tool.

A non-illustrated workpiece that is conveyed below the tool 6 is machined or shaped by the shaping or forming cutters of the tool. In order to ensure an optimum shaping of the workpiece, the presser elements 4 and 5 are provided ahead of and behind the tool 6 when viewed in the direction of transport or feed 11 of the workpiece. In order to achieve an optimum pressing effect, the presser elements 4 and 5 should be provided as close to the tool 6 as possible. If the tool 6 that is disposed on the spindle 7 is replaced by a tool having a different path diameter 9 and/or a different forming depth 8 of its cutters, the positions of the presser elements 4, 5 must be appropriately adjusted. This can be accomplished very easily and rapidly with the aid of the two position adjustment instruments 2 and 3 and the subsequently to be described configuration of the pressing mechanism. Even inexperienced workers can easily and precisely adjust the presser elements 4, 5 into the position required relative to the respective tool 6.

The position adjustment instruments 2, 3 are known and are each provided with a position indicating means 12 and 13 for digitally indicating the respective values. Each instrument 2, 3 is provided with a turn sleeve or dial 14, 15 for fixedly receiving a respective non-illustrated adjustment shaft. By turning the respective adjustment shaft, the presser elements 4, 5 are adjusted in the required direction relative to the stationary support means 1 in a manner that will be described subsequently. At the same time, the respective value is indicated in the position indicating means 12, 13 since the turn sleeves 14, 15 are coupled in a known manner with the indication elements.

The support means 1 preferably has an essentially plate-like shape so that it requires little space. So that it extends as close as possible to the tool 6, the support means 1 is provided with an appropriate concave recessed portion 16 that conforms to the path diameter 9 of the largest tool 6 that is to be disposed on the spindle 7.

One side of the support means 1 is provided with a guide means 17 for an intermediate carrier member 18 that supports the presser element 5. The intermediate member 18 is provided with an appropriate cooperating guide 19 that is adjustable along the guide means 17 of the support means 1. As a cooperating guide 19, the intermediate member 18 can, for example, be provided with a recessed portion having a U-shaped cross-sectional area in which the guide means 17 of the support means 1 engages. The recessed portion can also have the configuration of a dovetailed groove to which the guide means 17 appropriately corresponds.

One side of the support means 1 is provided with a threaded spindle 20 that is indicated only schematically in the drawing. A nut 21 that is fixedly connected to the intermediate member 18 is threaded onto the spindle 20. Thus, by turning the threaded spindle 20, it is possible to infinitely adjust the position of the intermediate member 18 along the guide means 17 of the support means 1.

The position of the threaded spindle 20 and the guide means 17 determines the direction of movement 22 of the intermediate member 18 and hence of the presser element 5. The presser element 5 is adjusted in the direction 22 if a tool 6 having a different path diameter 9 is employed. In addition, the presser element 5 can be adjusted relative to the intermediate member 18 in the direction of the double arrow 23. With this type of adjustment possibility, the presser element 5 can conform to the respective forming depth 8 of the shaping or forming cutters of the respective tool 6. To adjust the position of the presser element 5, a rotatably driven threaded spindle 24 is provided that is indicated only schematically in the drawing and is seated on a nut 25. This nut can be fixedly connected to the intermediate member 18 or to the presser element 5. In conformity therewith, the threaded spindle 24 is provided either on the presser element 5 or on the intermediate member 18.

To provide satisfactory guidance of the presser element 5, the intermediate member 18 is provided with a guide means 26 that cooperates with a cooperating guide 27 of the presser element 5. The cooperating guide 27 can be formed by a U-shaped or dovetailed edge portion of the presser element 5 into which the guide means 26 of the intermediate member 18 engages in the manner of a key or a tongue and groove.

The two threaded spindles 20 and 24 and the two guide means 17 and 26 are disposed at an angle to one another and converge in a direction toward the tool 6. In the illustrated embodiment, the two threaded spindles 20 and 24 are disposed at an acute angle relative to one another, and in particular an angle of about 60°.

The guide means 26 is provided on a guide portion 28 that extends obliquely from the intermediate member 18 and that is advantageously integrally formed with the intermediate member.

The presser element 4 can also be displaced in two directions that extend at an angle relative to one another in order to adapt its position relative to the path diameter 9 and the forming depth 8 of the respective tool 6. The presser element 4 is provided on a carriage portion 29 that is displaceably mounted on a further carriage portion 30 that in turn is displaceably disposed on the support means 1. The two carriage portions 29, 30 form a type of cross carriage via which the presser element 4 can be adjusted in the two directions of movement that will be described subsequently. An underside of the presser element 4, i.e. the carriage portion 29 to which it is attached, is provided with a downwardly projecting guide strip 31 that engages a corresponding groove 32 on the upper side of the carriage portion 30. The guide strip 31 and the groove 32 are disposed at an acute angle relative to the threaded spindle 20. The guide strip 31 and the threaded spindle 20 diverge in a direction toward the tool 6. The position of the guide strip 31 determines the direction of movement 33 in which the presser element 4 can be moved or adjusted relative to the carriage portion 30, i.e. to the support means 1, to adapt to different tool diameters.

In order to be able to adapt the presser element 4 to various forming depths 8 of the shaping or forming cutters of the respective tool 6, the carriage portion 30 can be adjusted on the support means 1 in the direction 34.

The carriage portion 29 can be adjusted in the direction of movement 33 via a threaded spindle 35. A non-illustrated nut, which is fixedly connected to the carriage portion 29, is seated on the threaded spindle 35. The threaded spindles 20 and 35 are coupled to the adjustment shaft that is received in the turn sleeve 15 of the position adjustment instrument 3, so that the two threaded spindles 20, 35 can be rotated together by turning the adjustment shaft. In this way, the carriage portion 29 and the intermediate member 18 are synchronously adjusted in opposite directions, namely in the directions of movement 33 and 22 respectively.

The carriage portion 30 is also adjusted via a threaded spindle 36, this time in the direction of movement 34. The carriage portion 30 is provided with a non-illustrated nut that is seated on the threaded spindle 36. The threaded spindle 36 and the threaded spindle 24 are coupled with the adjustment shaft that is fixedly received in the turn sleeve 14 of the position adjustment instrument 2. When this adjustment shaft is rotated, the two threaded spindles 24, 36 are rotated in such a way that the presser element 5 and the carriage portion 30 are synchronously adjusted in opposite directions, namely in the directions of movement 23 and 34 respectively.

The two directions of movement 33 and 34 are disposed at an acute angle relative to one another.

The carriage portion 29 and the intermediate member 18 are simultaneously and synchronously adjusted, so that the two presser element 4, 5 can be moved simultaneously in the directions of movement 33 and 22 to conform to different path diameters 9 of the tools 6. The spindle drives 20, 21; 35 are coupled together in the manner described and are connected to the position adjustment instrument 3 in such a way that the respective value of the tool diameter is digitally indicated in the position indicating means 13. By turning the adjustment shaft that is received in the turn sleeve 15, the respective tool diameter (path diameter 9) is established in the position indicating means. At the same time, via the spindle drives 20, 21; 35, the carriage portion 29 is shifted in the direction of movement 33 and the intermediate member 18 with the presser element 5 is shifted in the direction of movement 22.

By means of the two spindle drives 24, 25; 36, the carriage portion 30 and the presser element 5 are adjusted in the manner described. When the respective forming depths 8 of the shaping or forming cutters of the respectively utilized tool 6 are obtained, the respective value is immediately indicated in the position indicating means 12 of the position adjustment instrument 2. The presser elements 4,5 can therefore be very rapidly yet very precisely adjusted to the desired extent. The coupling of the spindle drives 24, 25 and 36, or 20, 21 and 35, can be effected mechanically via gears or electronically. Since the turn sleeves 14, 15 are coupled with the indication elements of the position indicating means 12, 13, the appropriate value for the forming depth 8 of the shaping or forming cutters, and for the path diameter 9 of the tool 6, is indicated immediately, so that the presser elements 4, 5 can be effortlessly adjusted into the required position relative to the tool 6.

When projected onto the plane of the drawing, the directions of movement 22, 23, 33, 34 have the shape of a W. To adjust to the various tool diameters, the presser elements 4 are displaced in the directions of movement 22 and 33. The presser elements 4,5 are displaced in the directions 23 and 34 in order to adapt them to the respective forming depth 8 of the shaping or forming cutters employed in the tool 6. These directions of movement are selected in such a way that the presser elements 4, 5 have the optimum spacing ahead of and behind the respective tool 6 when viewed in the direction of feed 11, so that the workpieces that are to be machined or shaped with the tool 6 will be optimally supported during the shaping process. After a tool has been exchanged, the presser elements 4, 5 are first moved along the directions of movement 22, 23, with the aid of the position adjustment instrument 3, to adapt to the respective tool diameter. Subsequently, via the position adjustment instrument 2, the position of the presser elements 4 and 5 is adapted to the respective forming depth 8 by displacing the presser elements in the directions of movement 23 and 34. With these two adjustments it is therefore possible in a straightforward manner to shift the presser elements 4, 5 into the respectively most advantageous position. The value that is to be established can be very easily set and read at the position indicating means 12, 13 of the position adjustment instruments 2, 3.

The various directions of movement 22, 23, 33, 34 are respectively disposed at acute angles relative to one another. In the drawing, two different positions are respectively indicated for the presser elements 4, 5, with these positions corresponding to different tool diameters. If the forming depth 8 of the shaping or forming cutters of the tool is taken into account during the adjustment, the presser elements 4, 5 are then subsequently displaced in the direction of movement 23, 34 in the manner described.

The directions of movement 22, 23, 33, 34 are determined first with reference to the various tools by determining the respective optimum position of the presser elements 4, 5. From the resulting measuring points, straight lines that best approximate the measuring points are then drawn to determine the directions of movement 23, 34 and 22, 33. This ensures that after the required adjustment relative to the respectively employed tool 6 the presser elements 4, 5 will assume an optimum or at least nearly optimum position.

In other respects, the presser elements 4, 5 have a known configuration.

The pressing mechanism has a structurally straightforward configuration and can also be readily operated by inexperienced personnel. With the aid of the position adjustment instruments 2, 3, the respective value of the path diameter and of the forming depth is established. By means of the adjustment drives, the presser elements 4,5 are shifted into the appropriate positions.

The required values for the forming depths 8 and the path diameters 9 can also be given via a CNC or computer numerical control of the machine. The spindles 20, 24, 35, 36 are then motor driven and the presser elements 4, 5 are displaced until they achieve the prescribed values by the CNC control.

In the illustrated embodiment, the adjustment shafts that are fixedly connected to the turn sleeves 14, 15 of the position adjustment instruments 2, 3 can be rotated either with motors or manually via handles.

It is also possible to individually displace each presser element 4, 5 in the respective direction 22, 23, 33, 34. In such a case, four position adjustment instruments are required, the turn sleeves of which are drivingly connected to the appropriate spindle. The displacement can again be carried out either manually or with motors.

With the inventive mechanism it is possible to easily and precisely adjust the presser elements in the machine in conformity with the measured path diameters and forming depths of the tools with the aid of the position adjustment instruments even before the tools are mounted on the spindles. This results in a saving of assembly time and an avoidance of adjustment errors.

The present invention is, of course, in no way restricted to the specific disclosure of the specification and drawing, but also encompasses any modifications within the scope of the appended claims.

What we claim is:

1. A pressing mechanism for machines for shaping workpieces, comprising:

at least one rotatably driven spindle for receiving a shaping tool having a path diameter that is determined by cutters of said tool;

a presser element disposed ahead of and a presser element disposed behind said spindle as viewed in a direction of feed of workpieces that are to be shaped, said direction of feed extending transverse to an axis of said spindle;

first means for moving said presser elements in opposite directions, both at an angle to said direction of feed, to adapt to varying tool path diameters; and second means for moving said presser elements in different opposite directions, also both at an angle to said direction of feed, to adapt to a respective forming depth of said cutters of said tool.

2. A pressing mechanism according to claim 1, wherein said directions of movement of said presser elements have the shape of a W when projected into a plane.

3. A pressing mechanism according to claim 2, wherein said first and second means for moving said presser elements are adjustment drives in the form of spindle drives.

4. A pressing mechanism according to claim 3, wherein those spindle drives for moving said presser elements in said opposite directions are coupled with at least one first position adjustment instrument that is provided with a position indicating means for indicating a path diameter of a tool.

5. A pressing mechanism according to claim 4, wherein those spindle drives for moving said presser elements in said different opposite directions are coupled with at least one second position adjustment instrument that has a position indication means for indicating said forming depth.

6. A pressing mechanism according to claim 5, wherein said path diameter and said forming depth are adjustable via said position indicating means of said position adjustment instrument.

7. A pressing mechanism according to claim 6, wherein each of said position adjustment instruments is provided with a turn sleeve that is coupled with indicating elements of said position indicating means.

8. A pressing mechanism according to claim 7, wherein said turn sleeves are coupled with said spindle drives.

9. A pressing mechanism according to claim 8, wherein said turn sleeves are mechanically coupled with said spindle drives.

10. A pressing mechanism according to claim 5, wherein said position adjustment instruments are electronically linked with said spindle drives.

11. A pressing mechanism according to claim 5, which includes a support means that is fixed to said machine, with said position adjustment instruments being provided on said support means.

12. A pressing mechanism according to claim 11, wherein one of said presser elements is provided on a first carriage portion that is displaceably mounted on a further carriage portion.

13. A pressing mechanism according to claim 12, wherein said further carriage portion is displaceably mounted on said support means.

14. A pressing mechanism according to claim 13, wherein said two carriage portions are displaceable at an acute angle relative to one another.

15. A pressing mechanism according to claim 12, wherein a second one of said presser elements is displaceably mounted on an intermediate carrier member that in turn is displaceably mounted on said support means.

16. A pressing mechanism according to claim 15, wherein said intermediate carrier member and said second one of said presser elements are displaceable at an acute angle relative to one another.

17. A pressing mechanism according to claim 16, wherein said presser elements are adjustable synchronously and together in opposite directions at said angle relative to one another.

* * * * *